United States Patent
Noest et al.

(10) Patent No.: US 9,680,671 B2
(45) Date of Patent: Jun. 13, 2017

(54) TRANSCEIVER DEVICE AND A METHOD FOR GENERATING A COMPENSATION SIGNAL

(71) Applicant: Intel IP Corporation, Santa Clara, CA (US)

(72) Inventors: Peter Noest, Munich (DE); Gregory Chance, Mundelein, IL (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/550,277

(22) Filed: Nov. 21, 2014

(65) Prior Publication Data

US 2015/0180685 A1    Jun. 25, 2015

(30) Foreign Application Priority Data

Dec. 23, 2013   (DE) .......................... 10 2013 114 797

(51) Int. Cl.
| | |
|---|---|
| *H03D 1/04* | (2006.01) |
| *H03B 21/00* | (2006.01) |
| *H04L 25/08* | (2006.01) |
| *H04B 1/40* | (2015.01) |
| *H04B 1/04* | (2006.01) |
| *H04B 1/10* | (2006.01) |
| *H04B 1/525* | (2015.01) |

(52) U.S. Cl.
CPC ........... *H04L 25/08* (2013.01); *H04B 1/0475* (2013.01); *H04B 1/10* (2013.01); *H04B 1/40* (2013.01); *H04B 1/525* (2013.01)

(58) Field of Classification Search
CPC  H04B 2001/0425; H04B 1/0483; H04B 1/40; H04B 7/0413; H04B 15/00; H04B 10/61; H04B 15/04; H04B 1/0007
USPC ........................................... 375/346; 327/107
See application file for complete search history.

(56) References Cited

U.S. PATENT DOCUMENTS

| | | | | | |
|---|---|---|---|---|---|
| 3,900,823 | A | * | 8/1975 | Sokal .................... | H03F 1/0216 330/129 |
| 5,206,919 | A | * | 4/1993 | Keating ....................... | 382/296 |

(Continued)

OTHER PUBLICATIONS

"Germany Application Serial No. 102013114 797.6, Office Action Mailed Aug. 13, 2014", W/ English Translation, 16 pgs.

*Primary Examiner* — Daniel Washburn
*Assistant Examiner* — Sarah Hassan
(74) *Attorney, Agent, or Firm* — Schwegman Lundberg & Woessner, P.A.

(57) ABSTRACT

A transceiver device 100 includes a transmit path module 110, a receive path module 120 and a compensation signal generator module 130. The transmit path module 110 generates a high frequency transmit signal 112 based on a baseband transmit signal. The receive path module 120 generates a baseband receive signal 122 based on a received high frequency receive signal 114. Further, the compensation signal generator module 130 generates a compensation signal 132 comprising at least one signal portion with a frequency equal to a frequency of an undesired signal portion of the baseband receive signal 122 caused by an undesired signal portion within the high frequency transmit signal 112 comprising a frequency equal to an integer multiple larger than 1 of a transmit frequency of the high frequency transmit signal 112.

24 Claims, 4 Drawing Sheets

(56) References Cited

U.S. PATENT DOCUMENTS

| | | | | |
|---|---|---|---|---|
| 6,252,464 B1* | 6/2001 | Richards | .............. | H03C 3/0941 |
| | | | | 327/107 |
| 6,795,843 B1* | 9/2004 | Groe | ........................ | G06G 7/18 |
| | | | | 708/801 |
| 2001/0007435 A1* | 7/2001 | Ode | ...................... | H03F 1/3247 |
| | | | | 330/149 |
| 2003/0021367 A1* | 1/2003 | Smith | .................... | H04B 1/123 |
| | | | | 375/346 |
| 2004/0203458 A1* | 10/2004 | Nigra | ......................... | 455/67.13 |
| 2004/0224658 A1* | 11/2004 | Borremans | ............ | H03C 1/547 |
| | | | | 455/323 |
| 2005/0075077 A1* | 4/2005 | Mach | .................... | H04B 1/406 |
| | | | | 455/67.13 |
| 2006/0227845 A1* | 10/2006 | Degertekin | .............. | G01D 5/38 |
| | | | | 372/102 |
| 2008/0311860 A1* | 12/2008 | Tanaka et al. | .................. | 455/73 |
| 2009/0147648 A1* | 6/2009 | Vlutters | ................ | H03M 13/00 |
| | | | | 369/59.22 |
| 2009/0232191 A1* | 9/2009 | Gupta | ........................... | 375/216 |

* cited by examiner

TRANSCEIVER DEVICE AND A METHOD FOR GENERATING A COMPENSATION SIGNAL

PRIORITY APPLICATION

This application claims the benefit of priority to German Application No. 102013114797.6, filed Dec. 23, 2013, which is incorporated herein by reference in its entirety.

TECHNICAL FIELD

The present disclosure relates to the reduction of undesired signal portions within receive signals and in particular to a transceiver device and a method for generating a compensation signal.

BACKGROUND

Transceivers simultaneously transmitting and receiving signals are often facing degradations of the receive signals due to undesired influences from the transmit path. For example, receive signals may comprise undesired harmonic signal portions caused by the signal processing within the transmit path. For example, in multiband RF transmit and receive systems (e.g. Third Generation Partnership Project 3GPP Carrier Aggregation), the case of third harmonic of transmit signals Tx falling directly into receive signals Rx band can cause a decreased receiver sensitivity. It is desired to reduce the influence of harmonics caused within the transmit path to receive signals and/or to increase the receiver sensitivity.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity. Accordingly, while examples are capable of various modifications and alternative forms, the illustrative examples in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing illustrative examples only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
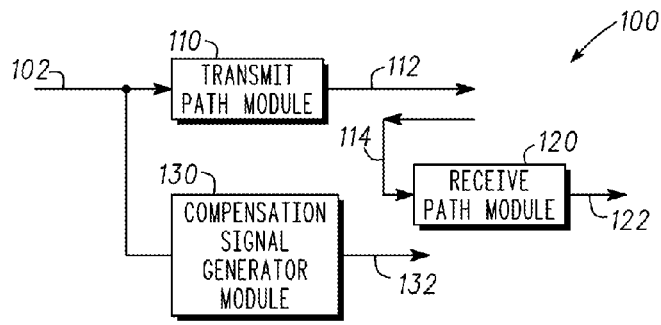
FIG. 1 shows a block diagram of a transceiver device.

FIG. 1 shows a block diagram of a transceiver device 100 according to an example. The transceiver device 100 comprises a transmit path module 110, a receive path module 120 and a compensation signal generator module 130. The transmit path module 110 generates a high frequency transmit signal 112 comprising a frequency component based on a baseband transmit signal. The receive path module 120 generates a baseband receive signal 122 based on a received high frequency receive signal 114. Further, the compensation signal generator module 130 generates a compensation signal 132 by nonlinear signal processing of the baseband transmit signal. The compensation signal comprises at least a signal portion of a harmonic (e.g. integer multiple) of the frequency component of the high frequency transmit signal that interferes with a channel bandwidth of the receive path module. In other words, the compensation signal generator module 130 generates a compensation signal 132 comprising at least a signal portion with a frequency equal to a frequency of an undesired signal portion of the baseband receive signal 122 caused by an undesired signal portion within the high frequency transmit signal 112 comprising a frequency equal to an integer multiple larger than one of a transmit frequency of the high frequency transmit signal 112. Further, the compensation signal generator 130 may be configured to generate the compensation signal 132 based on nonlinear signal processing of the baseband transmit signal 102.

By generating a compensation signal comprising signal portions corresponding to undesired signal portions within the baseband receive signal 122 caused by undesired harmonic signal portions within the high frequency transmit signal 112, at least a part of the undesired harmonic signal portions within the baseband receive signal 122 may be compensated based on the compensation signal 132. In this way, the sensitivity of the receive path of the transceiver device 100 may be improved.

The transmit path module 110 may comprise at least an up-conversion module (e.g. comprising a mixer and/or a radio frequency digital-to-analog converter) up-converting the baseband transmit signal 102 from the baseband domain (e.g. below 500 MHz) to the radio frequency domain (e.g. 500 MHz to 50 GHz) to generate the high frequency transmit signal 112. Further, the transmit path module 110 may comprise further signal processing modules (e.g. power amplifier, filter, digital-to-analog converter and/or an up-sampling module).

The receive path module 120 may comprise at least a down-conversion module (e.g. comprising a mixer and/or a radio frequency analog-to-digital converter) for down-converting the high frequency receive signal 114 from the radio frequency domain to the baseband domain to generate a baseband receive signal 122. The receive path module 120 may comprise one or more further signal processing modules (e.g. low noise amplifier, analog-to-digital converter, filter and/or a down-sampling module) for processing the high frequency receive signal and/or the baseband receive signal 122, for example.

The transceiver device 100 may be connected or connectable to an internal or external baseband processor module providing the baseband transmit signal 102 and/or may receive a compensated baseband receive signal. Further, the transceiver device 100 may be connected or connectable to an internal or external antenna module for transmitting the high frequency transmit signal 112 and/or receiving the high frequency receive signal 114. The transceiver device 100 may transmit the high frequency transmit signal 112 and receive the high frequency receive signal 114 at the same time, for example.

Although, the high frequency transmit signal 112 and the high frequency receive signal 114 may be located in different frequency bands, harmonic signal portions caused by the signal processing within the transmit path may cause corresponding signal portions within the receive band due to parasitic coupling 213, cross-talk and/or reflections, for example. An undesired harmonic signal portion may be a signal portion with a frequency equal to an integer multiple larger than one of a frequency of a desired signal portion. A signal portion may be a part of a signal with larger bandwidth than the signal portion itself or a signal portion may be obtained by filtering a signal with larger bandwidth.

The compensation signal 132 comprises at least a signal portion of a harmonic (e.g. integer multiple) of a frequency component of the high frequency transmit signal that interferes with a channel bandwidth of the receive path module. A frequency component of the high frequency transmit signal interferes with a channel bandwidth of the receive path module, if the frequency lies in the receiver bandwidth of the receiver part of the transceiver device 100, for example.

For example, the compensation signal 132 comprises at least a signal portion corresponding to an undesired signal portion within the baseband receive signal 122 caused by an undesired harmonic signal portion within the high frequency transmit signal 112. Further, the compensation signal 132 may comprise more than one signal portions with frequencies equal to different frequencies of undesired signal portions (or signal portions with a plurality of frequencies or frequency bands) of the baseband receive signal 122 caused by different undesired harmonic signal portions within the high frequency transmit signal 112.

The transmit frequency of the high frequency transmit signal may be a carrier frequency of the high frequency transmit signal 112 or a frequency of a local oscillator signal used for up-conversion of the baseband transmit signal 102 to the radio frequency domain, for example.

The compensation signal generator module 130 may generate the compensation signal 132 based on the baseband transmit signal 102. The generation of the undesired harmonic signal portions caused during processing of the transmit signal within the transmit path may be reproduced based on the baseband transmit signal 102. For this, the compensation signal generator module 130 may process the baseband transmit signal 102 or a baseband signal derived from the baseband transmit signal 102. In this way, a highly accurate compensation signal may be provided.

For example, the compensation signal generator module 130 may generate the compensation signal 132 to cancel or compensate in the receive path module at least a part of an undesired harmonic signal caused by the transmit path module. The undesired harmonic signal frequency being an integer multiple larger than one of the high frequency transmit signal frequency and may cover at least a portion of the received high frequency receive signal. For example, the compensation signal generator module comprises a nonlinear distortion of the baseband transmit signal.

The compensation signal 132 may be an analog signal or a digital signal and the compensation signal generator module 130 may be at least partly an analog signal processing module or may be a digital signal processing module. For example, the compensation signal generator module 130 may be completely located in the digital domain of the transceiver device 100 and the compensation signal 132 may be a digital signal. In this way, the compensation signal generator module 130 may be implemented with low hardware effort and/or with low power consumption.

The compensation signal 132 can be used for compensating at least a part of undesired signal portions within the baseband receive signal 122. For example, the transceiver device 100 comprises a compensation module generating a compensated baseband receive signal based on the compensation signal 132 and a baseband signal containing information on the baseband receive signal (e.g. the baseband receive signal itself or a baseband signal derived from the baseband receive signal). The compensation module may combine the compensation signal 132 and the baseband signal containing information on the baseband receive signal in various ways. For example, the compensation module may subtract the compensation signal 132 from the baseband signal containing information on the baseband receive signal 122. In this way, undesired signal portions caused by undesired harmonic signal portions of the high frequency transmit signal 112 may be reduced.

For example, the compensation module may be arranged before a narrowest low pass filter (e.g. low pass filter module) of the receive path with regard to a signal processing direction. The signal processing direction of the receive path extends from an antenna module to a baseband processor module through the receive path module, for example. In this way, a replication or a reproduction of the frequency response of the narrowest filter of the receive path may be avoided for the generation of the compensation signal 132, for example.

According to an aspect, the compensation signal generator module is configured to generate the compensation signal based on a frequency shift applied to a baseband signal containing information on the baseband transmit signal.

The frequency shift may be unnecessary in some cases (e.g. where RX frequency is exactly 5 times (or another integer) the TX frequency), but it may be required in other cases.

According to an aspect, the compensation signal generator module is configured to generate the compensation signal with a phase corresponding to a phase of the baseband transmit signal multiplied by an integer greater than one.

The phase relation, that may be obtained by tripling (e.g. integer=3) the original phase may be more general than tripling the frequency (which may then be chopped off again). The phase may have this general relation even though by filtering off some components it may be not a precise 1:n relation.

For compensation the n-th harmonic, the phase may be pushed n-fold, while the amplitude may have components both proportional to A^n and higher polynomials. Therefore the phase may be easier to trace.

Figure 2:
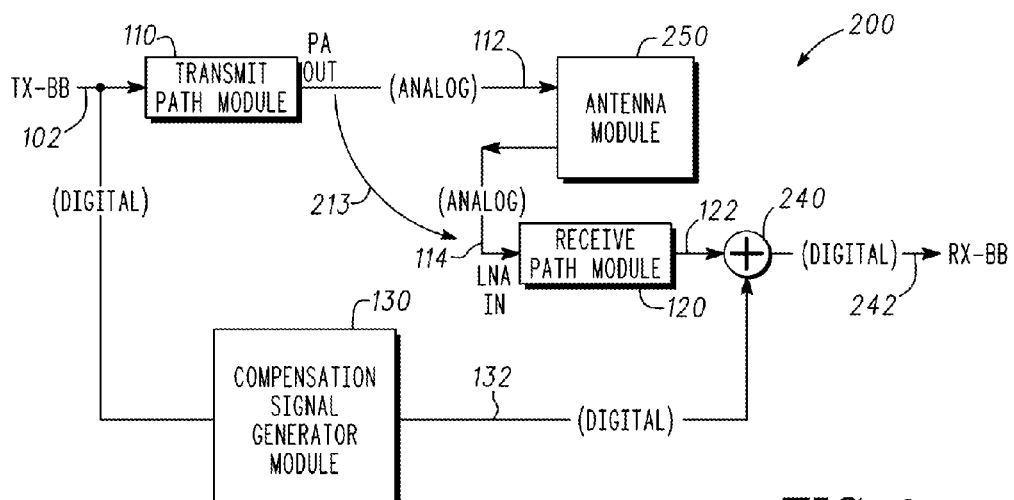
FIG. 2 shows a block diagram of another transceiver device with a compensation module and an antenna module.

FIG. 2 shows a block diagram of a transceiver device 200 according to an example. The implementation of the transceiver device 200 is similar to the implementation shown in FIG. 1. The compensation signal generator module 130 is a digital signal processing module and the compensation signal 132 is a digital signal. The baseband transmit signal Tx-BB 102 is provided to the transmitter Tx path and the compensation signal generator module 130. The transmit path module 110 provides the high frequency transmit signal Tx-RF 112, which is an analog signal, through a power amplifier output PAout to an antenna module 250. The antenna module comprises a front end including one or more antennas and one or more filters, for example. The antenna module 250 provides a high frequency receive signal Rx-RF 114, which is an analog signal, to a low-noise amplifier input LNAin of the receive path module 120. The receiver Rx path provides a baseband receive signal 122 to a compensation module 240. The compensation signal generator module 130 generates a compensation signal 132 comprising an Nth harmonic digital replica (N represents an integer multiple larger than 1) by the help of nonlinear and linear distortion, for example. The compensation module 240 subtracts the digital compensation signal 132 from the baseband receive signal 122 to generate a compensated digital baseband receive signal Rx-BB 242.

FIG. 2 shows a principle or coarse block diagram for generation of the Nth harmonic. In the case of a third harmonic, N=3, for example. FIG. 2 may show a transceiver with digital cancellation of transmitter Tx harmonic on the receiver Rx side, for example. Tx-RF may be an analog transmit radio frequency analog signal, Rx-RF may be an analog receive radio frequency analog signal, PAout may be the power amplifier output, LNAin may be a low-noise amplifier input, Tx-BB may be a transmit baseband signal and Rx-BB may be a receive baseband signal, for example.

More details and aspects are explained in connection with a proposed concept or one or more examples described above (e.g. FIG. 1). In other words, the transceiver device 200 may comprise one or more additional optional features corresponding to one more aspects described in connection with the proposed concept or one or more examples described above.

Figure 3:
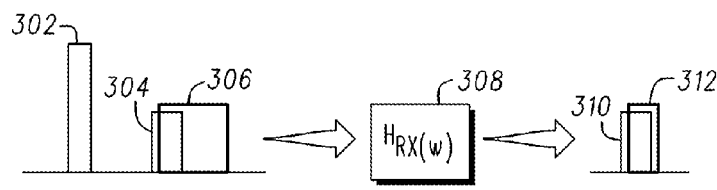
FIG. 3 shows a schematic illustration of an uncompensated baseband receive signal.

FIG. 3 shows an illustration of spectral density diagrams for a transmit signal harmonic interfering with a receive signal. For example, the radio frequency transmit signal Tx-RF third harmonic overlap of the desired receiver Rx channel may be a function of allocated channels, channel bandwidth and/or resource blocks. Only the portion of the transmitter Tx third harmonic spectrum that falls within the receiver Rx channel filter bandwidth may be seen at the baseband BB. This is shown in FIG. 3 indicating a transmitter Tx band XX 302, the third harmonic H3 of the transmitter Tx band XX 304 partially overlapping a receiver Rx band YY 306 and remaining signal portions of the third harmonic H3 of the transmitter Tx band XX 310 and the receiver Rx band YY 312 after applying the receiver channel low-pass filter $H_{Rx}(\omega)$ 308 which may be a part of the receive path module 120. This receiver Rx low-pass filter response may be prior to the point in the receiver Rx chain where the cancellation or compensation is applied and may be applied to the replica of the third harmonic before correlation with and cancellation of the transmitter Tx third harmonic in the received signal, for example.

Harmonics may be generated in multiple components in the front end. In addition to the nonlinear power amplifier PA, there may also be significant harmonic generation in switches (antenna transmit/receive T/R as well as antenna tuners) and to a lesser degree in filters and connectors, for example. Therefore, multiple harmonic sources and paths may be considered. On the cancellation or compensation side this may be addressed by using adaptive filters, for example.

Figure 4:
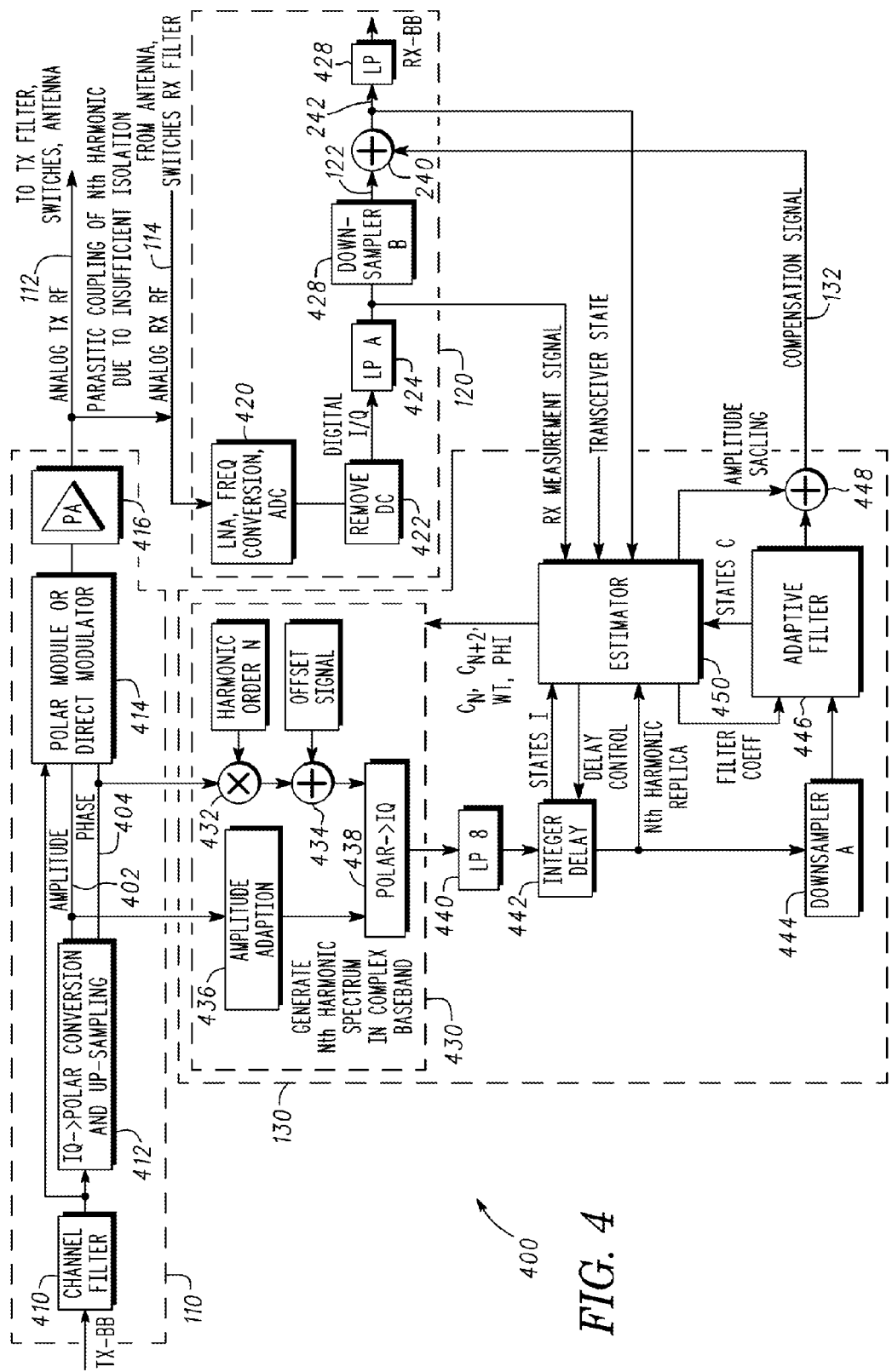
FIG. 4 shows a detailed block diagram of a transceiver device.

FIG. 4 shows a block diagram of a transceiver module 400 according to an example. The implementation of the transceiver module 400 is similar to the implementation shown in FIG. 1 or 2. The transceiver module comprises a transmit path module 110, a receive path module 120 and a compensation signal generator 130.

The transmit path module 110 receives a baseband transmit signal Tx-BB (e.g. an in phase-quadrature phase modulated baseband transmit signal) at an input and provides a high frequency transmit signal 112 (e.g. analog transmitter Tx radio frequency RF signal) at an output to an antenna module (e.g. transmitter Tx filter, switches and antenna). The transmit path module 110 comprises a channel filter module 410 filtering the baseband transmit signal 102 and provides the filtered baseband transmit signal to an in phase-quadrature phase IQ to polar conversion and up-sampling module 412 and a polar modulator or direct modulator module 414. The in phase-quadrature phase to polar conversion and up-sampling module 412 converts the filtered baseband transmit signal to a polar modulated baseband transmit signal and up-samples the polar modulated baseband transmit signal. The up-sampled polar modulated baseband transmit signal is provided to the polar modulator module 414 and to a harmonic generator module 430 of the compensation signal generator module 130. Alternately, the polar conversion module 412 can be bypassed and a direct IQ modulator 414 may be used. The polar modulator or direct IQ modulator module 414 up-converts the polar modulated baseband transmit signal or the in phase-quadrature phase modulated transmit signal to generate a high frequency transmit signal. The up-converted transmit signal is amplified by a power amplifier PA module 416 to generate the high frequency transmit signal 112 provided at the output of the transmit path module 110.

The receive path module 120 receives a received high frequency receive signal 114 (e.g. analog receiver Rx radio frequency RF signal) at an input from the antenna module (e.g. antenna, switches and receiver Rx filter) and provides a filtered compensated baseband receive signal Rx-BB at an output. The high frequency receive signal 114 is amplified, down-converted to a baseband domain and analog-to-digitally converted by a low noise amplifier LNA/frequency conversion/analog-to-digital conversion ADC module 420 (e.g. comprising a low noise amplifier, a frequency conversion module and an analog-to-digital converter), resulting in a digital in phase-quadrature phase I/Q baseband receive signal. Further, a direct current DC portion within the down-converted baseband receive signal may be removed or reduced by a DC-remove-module 422. The digital in phase-quadrature phase baseband receive signal is filtered by a low pass filter LP A 424. The low pass filtered baseband receive signal is provided to an estimator module 450 of the compensation signal generator module 130 and to a down-sampling module 428 (down sampler B). The down-sampling module 428 reduces the sample rate of the filtered baseband receive signal to generate the baseband receive signal 122 to be adapted by the compensation signal 132. The baseband receive signal 122 is provided to a compensation module 240. The compensation module 240 subtracts the compensation signal 132 from the baseband receive signal 122 to generate a compensated baseband receive signal 242. The compensated baseband receive signal 242 is provided to a low pass LP channel filter 428 to generate the filtered compensated baseband receive signal Rx-BB. Further, an error signal e may be determined based on the compensated baseband receive signal 242 (e.g. by a root mean square algorithm) and may be provided to the estimator module 450 of the compensation signal generator module 130.

Between the transmit path and the receive path, a parasitic coupling of Nth harmonic due to insufficient isolation may occur, illustrated by reference number 213.

The baseband transmit signal TX-BB may be provided from a baseband processor module and the filtered compensated baseband receive signal Rx-BB may be provided to the baseband processor module for further processing.

The compensation signal generator module 130 receives the amplitude signal 402 and the phase signal 404 of the polar modulated baseband transmit signal, the filtered digital in phase-quadrature phase baseband receive signal as receiver Rx measurement signal, the error signal and a transceiver state signal containing information on a transceiver state and provides the compensation signal 132. In more general words, in some examples, the compensation signal generator 130 generates the compensation signal 132 based on the baseband transmit signal 102 (e.g. the baseband transmit signal itself or a baseband signal derived from the baseband transmit signal).

The baseband transmit signal provided to the compensation signal generator module 130 is a polar modulated baseband transmit signal with an amplitude signal 402 and a phase signal 404. In some examples, the compensation signal generator module 130 comprises a harmonic generator module 430 generating a harmonic generator output signal (e.g. the compensation signal or a signal used for generating the compensation signal) based on the polar modulated baseband transmit signal. For example, the harmonic generator module 430 (e.g. baseband BB harmonic replica generation) gets the amplitude and phase information of the transmit baseband Tx-BB signal and generates the desired harmonic spectrum while providing optionally a frequency and/or phase shift. For the polar transmitter Tx architecture, the amplitude and phase signal can be directly taken from the signal path. For a quadrature transmitter Tx architecture, the addition of a CORDIC (Coordinator Rotation Digital Computer Algorithm) can provide the polar signal. By utilizing the polar signal (amplitude and phase), a low complexity approach may be implemented for the harmonic generation with optional integrated frequency offset translation, for example.

The phase path of the harmonic generator module 430 generates the harmonics phase of order N (integer multiple larger than 1). It comprises a multiplier by N (e.g. if N=3, in the case of third harmonic, the input phase is multiplied by 3). In more general words, in some examples, the harmonic generator module 430 may comprise a multiplier module 432 generating a multiplier output signal based on a multiplication of the phase signal 404 of the polar modulated baseband transmit signal with the integer multiple N.

Further, the harmonic generator module 430 comprises a slope/offset adder to apply a predetermined frequency offset or phase ramp ($\Delta w = \Delta phi/\Delta t$) and estimated phase offset (e.g. to phase align the compensation signal with the receiver Rx signal). In more general words, in some examples, the harmonic generator module 430 may comprise an adder module 434 generating an adder output signal based on an addition of the phase signal 404 of the polar modulated baseband transmit signal or the multiplier output signal and an offset signal (e.g. $\omega^*t + phi$). For example, the offset signal may be a frequency offset signal comprising information on an frequency offset. The frequency offset may be implemented, if there is an offset between the RF receive frequency fRx (e.g. 114) and the integer multiple of the RF transmit frequency N*fTx, (e.g. 112) and may be calculated according to:

$$w = 2*pi*(N*fTx - fRx)$$

This frequency offset can be predetermined or calculated according to the allocated transmitter Tx and receiver Rx bands, channel frequencies, allocated resource blocks, and/or any applied frequency offset of the radio frequency local oscillators RFLO's (e.g. such as automatic frequency control AFC). The phase offset may be provided from a least mean square LMS based estimation algorithm (e.g. used by the estimator module).

The amplitude path or amplitude section of the harmonic generator module 430 generates the harmonics amplitude spectrum. In the diagram (FIG. 4), the amplitude is nonlinear distorted by two orders to achieve better accuracy of the harmonic spectrum generation (e.g. also only a single order representing third order for a third harmonic or more orders may be possible) with reasonable performance, for example. In more general words, in some examples, the harmonic generator module 430 comprises an amplitude adaptation module 436 generating an amplitude adaptation output signal based on the amplitude signal 402 of the polar modulated baseband transmit signal and at least one amplitude adaptation parameter signal. The amplitude adaptation parameter signal may comprise information on a nonlinear (amplitude) distortion. The amplitude adaptation parameter signal may contain amplitude adaptation parameter $c_N$, for example.

The coefficients may be provided from a least mean square LMS based estimation algorithm (used by the estimator module) or a least square equation solving applied according to:

$$c_N * A^N + c_{N+2} * A^{N+2}$$

or as example for third harmonic:

$$c_3 * A^3 + c_5 * A^5$$

The resulting polar modulated baseband signal comprising the amplitude adaptation output signal and the adder output signal may be used as compensation signal or may be further processed in the polar modulated domain. Alternatively, the polar harmonic signal is converted to a complex in phase-quadrature phase IQ signal at the output of the harmonic generator module 430 as shown in FIG. 4. In more general words, in some examples, the harmonic generator module 430 comprises a coordinate conversion module 438 (polar to in phase-quadrature phase) generating an in phase-quadrature phase modulated baseband transmit signal (comprising harmonic signal portions) based on the amplitude adaptation output signal and the multiplier output signal or the adder output signal.

Alternatively to the harmonic spectrum generation shown in FIG. 4, a similar harmonic spectrum generation may be implemented based on a baseband transmit signal being an in phase-quadrature phase modulated baseband transmit signal. In this case, the harmonic generator module may generate the harmonic generator output signal based on at least determining the in phase-quadrature phase modulated baseband transmit signal to the power of the integer multiple (e.g. three for the third harmonic). Further, the transmitter Tx reference signal may be up-converted by at least half the channel bandwidth BW to the real domain prior to cubing (or squaring or whatever appropriate power) and down-converting with appropriate frequency offset, for example. In other words, further a frequency up-conversion to at least half a channel bandwidth and a frequency shift may be optionally done, for example.

In both cases, an in phase-quadrature phase modulated baseband transmit signal containing harmonic signal portions represents the harmonic generator output signal.

The harmonic generator output signal is filtered by a low pass filter module 440 of the compensation signal generator module 130. The frequency response of the low pass filter LP B 440 of the compensation signal generator module 130 may match to the frequency response of the low pass filter LP A 424 of the receive path module 120. Additionally it may remove alias for the following down-conversion block 444, for example. Furthermore, the low pass filter module LP B may match the overall static frequency response from leaking transmitter Tx part to receiver Rx cancellation or compensation point, including the response of the low pass filter module LP A 424, for example. In more general words, in some examples, the compensation signal generator module 130 comprises a low pass filter module generating a low pass filter module output signal by low pass filtering a baseband signal containing information on the harmonic generator output signal (e.g. the harmonic generator output signal or a signal derived from the harmonic generator output signal). Optionally, the low pass filter module 440 comprises a frequency response corresponding to a frequency response of a low pass filter module 424 of the receive path.

The low pass filter LPB 440 may be a wideband filter with higher cut-off frequency than the channel filter module LP 428 of the receive path module 120, for example. In more general words, in some examples, the low pass filter module 440 comprises a cut-off frequency higher than a cut-off frequency of a channel filter of the receive path.

The low pass filter module output signal is provided to an integer delay module 442. The integer delay may match the delay between Nth harmonic replica and receiver Rx measurement signal. Optionally, it may further provide some integer delayed samples for correlation proposed to the estimator module 450 (states i). In more general words, in some examples, the compensation signal generator module 130 may comprise an integer delay module 442 generating an integer delay module output signal by delaying a baseband signal containing information on the harmonic generator output signal (e.g. the harmonic generator output signal itself or a baseband signal derived from the harmonic generator output signal, for example, the low pass filter module output signal).

The integer delay module output signal is provided to a down sampling module 444 (down sampler A) and optionally to the estimator module 450 (e.g. Nth harmonic replica). The sampling rate of the harmonic generator module 430 may cover (N+2) times the transmitter Tx bandwidth to avoid alias. The down sampler A 444 and the down sampler B 428 may have the same down sampling ratios, for example. The usage of the down samplers A, B may provide a lower sampling rate for the optional adaptive filter 446. The down sampler A 444 and/or the down sampler B 428 may be unnecessary or removed, if the cancellation or compensation operates on high sampling rate, for example. In more general words, in some examples, the compensation signal generator module 130 may comprise a down sampling module 444 generating a down sampling module output signal by down sampling a baseband signal containing information on the harmonic generator output signal (e.g. the harmonic generator output signal itself of a baseband signal derived from the harmonic generator output signal, for example, the integer delay module output signal or the low pass filter module output signal). Optionally, the down sampling module 444 comprises a sampling ratio equal to a sampling ratio of a down sampling module 428 of the receive path.

The down sampling module output signal is provided to an adaptive filter module 446. This filter may be a programmable fractional delay filter to adjust remaining fine delays of the Nth harmonic replica and the receiver Rx measurement signal, for example. In case of several non-flat frequency responses of the harmonic analog coupling on the radio frequency RF side, this filter can be an adaptive filter rebuilding not only the fractional delay, but the whole frequency response instead (e.g. frequency response of duplexer of antenna module). Also multipath harmonic sources and multipath propagation delays can be addressed by using this adaptive filter 446. In more general words, in some examples, the compensation signal generator module 130 comprises an adaptive filter module 446 generating an adaptive filter module output signal by adaptively filtering a baseband signal containing information on the harmonic generator output signal (e.g. the harmonic generator output signal itself or a baseband signal derived from the harmonic generator output signal, for example, the down sampling module output signal or the low pass filter module output signal). Optionally, the adaptive filter module may delay the baseband signal containing information on the harmonic generator output signal by a delay below a minimal delay generatable by the integer delay module 442 or below a resolution of the integer delay module 442. Further optionally, the adaptive filter module 446 may filter the baseband signal containing information on the harmonic generator output signal corresponding to a multipath harmonic source or a multipath propagation delay, for example.

Further, the filter C 446 (fractional delay filter or adaptive) may provide a signal containing information on states C of the filter to the estimator module 450. The estimator module 450 may provide a signal containing information on filter coefficients to the adaptive filter module 446 for controlling the filter. For example, an adaptive least mean square LMS filter may be used. The control algorithm may use the complex error signal e and states C to adjust the complex coefficients (filter coefficients) of the adaptive filter module 446.

The adaptive filter module output signal is provided to an amplitude scaling and summation point 448. The amplitude scaling may increase the compensation range on the receiver Rx side. Optionally, the amplitude scaling may be preset to an appropriate value. If no adaptive filter is used, the amplitude scaling may be used for continuously least mean square LMS based amplitude scaling, for example. In more general words, in some examples, the compensation signal generator module 130 comprises an amplitude scaling module 448 generating an amplitude scaling module output signal by multiplying a baseband signal containing information on the harmonic generator output signal (e.g. the harmonic generator output signal itself or a baseband signal derived from the harmonic generator output signal, for example, the adaptive filter module output signal, the down-sampling module output signal, the integer delay module output signal or the low pass filter module output signal) with an amplitude scaling signal (e.g. provided by the estimator module).

One or more of the aforementioned modules may be optional modules. For example, the harmonic generator output signal, the amplitude scaling module output signal, the adaptive filter module output signal, the adaptive filter module output signal, the down-sampling module output signal, the integer delay module output signal or the low pass filter module output signal may already represent a compensation signal 132.

The harmonic spectrum generation, the delay sample generation (states i), the adaptive filter characteristic and/or the amplitude scaling may be controlled by parameters provided by an estimator module 450. The estimator module 450 may provide the nonlinear coefficients (e.g. $c_N$, $c_{N+2}$, $\omega t$, phi), the amplitude scaling, a phase shift, the integer delay (delay control) and optionally the filter coefficients, for example. The estimator module 450 may make use of correlation, complex correlation, least square algorithm, adaptive filtering, complex adaptive filtering, adaptive coefficient updating and/or learning depending on the transceiver state, for example. In more general words, in some examples, the compensation signal generator module 130 comprises an estimator module 450 providing at least one estimator module output signal containing information on at least one parameter for phase adaptation, frequency adaptation or amplitude adaptation to the harmonic generator module 430.

Further, the estimator module 450 may generate the at least one estimator module output signal based on a baseband signal containing information on the baseband receive signal (e.g. Rx measurement signal), a baseband signal containing information on the harmonic generator output signal (e.g. Nth harmonic replica) and a transceiver state information, for example.

Optionally, the estimator module 450 generates the at least one estimator module output signal based on an error signal e derived from a compensated baseband receive signal 242 after consideration of the compensation signal 132.

Further optionally, the estimator module 450 may generate the estimator module output signal based on differently delayed versions of the baseband signal containing information on the harmonic generator output signal.

Optionally, the estimator module may generate the at least one estimator module output signal based on at least one adaptive filter state (state C) provided by the adaptive filter module 446 of the compensation signal generator module 130.

Further, estimator module 450 may provide at least one filter coefficient to the adaptive filter module 446 of the compensation signal generator module 130.

Further optionally, the estimator module 450 may provide the amplitude scaling signal to the amplitude scaling module 448 of the compensation signal generator module 130.

Optionally, the estimator module 450 may provide a delay control signal to the integer delay module 442 of the compensation signal generator module 130 for controlling a delay generated by the integer delay module 442.

Optionally, alternatively or additionally to one or more aspects mentioned above, a bandwidth of the baseband signal containing information on the baseband receive signal (e.g. low pass filter in phase-quadrature phase signal or receiver Rx measurement signal) provided to the estimator module 450 is substantially equal (e.g. neglecting a variation below 10% of the bandwidth) to a bandwidth of the compensation signal 132. In this way, the estimator module 450 may determine parameters more accurately, for example.

FIG. 4 shows a more detailed block diagram of a proposed transceiver device 400. The thick lines are carrying complex in phase-quadrature phase IQ signals and/or the thick (gray) lines are carrying multiple lines (e.g. many control lines, for example). The transceiver device 400 may implement an Nth harmonic spectrum generation and adaptive filtering in complex baseband BB domain, for example.

Optionally, the transceiver device 400 may comprise an up-sampling module (e.g. part of the in phase-quadrature phase to polar conversion and up-sampling module 412) generating an up-sampled baseband transmit signal by sampling the baseband transmit signal with a frequency of at least the integer multiple times the transmit frequency of the high frequency transmit signal. In other words, when calculating the (third) harmonic by multiplying the phase or taking the in phase-quadrature phase I/Q baseband samples to the (third) power, the bandwidth of the signal may be increased by a factor (3) and correspondingly the original signal may be oversampled at least by this factor to avoid aliasing, for example. For a polar transmitter, the signal may be oversampled (and interpolated) already heavily so that this signal may be taken.

More aspects and details are explained in connection with one or more examples above (e.g. FIGS. 1 and 2). In other words, the transceiver device 400 may comprise one or more additional optional features corresponding to one more aspects mentioned in connection with the proposed concept or one or more examples described above.

Optionally, alternatively or additionally to one or more aspects mentioned above, a proposed transceiver device may comprise a memory unit storing at least one parameter used for phase adaption, frequency adaption or amplitude adaption by the harmonic generator module. For example, the nonlinear coefficients, delay states, amplitude and/or fractional/adaptive filter states may be stored and reapplied for reducing the settling time (e.g. during aggregated receiver Rx carrier warm up). In other words, the memory unit may provide the at least one parameter to the harmonic generator module for re-use.

Optionally, additionally or alternatively to one or more aspects mentioned above, a proposed transceiver module may comprise a compensation control module deactivating a consideration of the compensation signal, if signal portions of the high frequency receive signal caused by undesired signal portions within the high frequency transmit signal comprising frequencies equal to an integer multiple of a transmit frequency of the high frequency transmit signal are located mainly or only at frequencies outside a current receive band of the receive path. In other words, if no or only few undesired harmonic signal portions are located within the receive band, the consideration of the compensation signal can be deactivated (e.g. by deactivating the compensation signal generator module or the compensation module).

Alternatively or additionally, the compensation control module may activate the consideration of the compensation signal, if a desense of the baseband receive signal or the receiver of the transceiver due to signal portions of the baseband receive signal caused by undesired signal portions within the high frequency transmit signal comprising frequencies equal to an integer multiple of a transmit frequency of the high frequency transmit signal exceeds a predefined desense threshold. By selecting a low predefined desense threshold (e.g. indicating a magnitude of a reduction of sensitivity), the sensitivity of the receiver may be high and by selecting a high predefined desense threshold, the power consumption may be reduced due to the deactivation of the compensation, for example.

For example, a transceiver device comprising a transmit path module configured to generate a high frequency transmit signal based on a baseband transmit signal and a receive path module configured to generate a baseband receive signal based on a received high frequency receive signal. Further, the transceiver device comprises a compensation signal generator module configured to generate a compensation signal by generating a compensation signal derived from the baseband transmit signal applying a non-linear signal processing function causing spectrum widening and by frequency shifting the compensation signal to the frequency position corresponding to the frequency position of the reception of an unwanted harmonic of the desired RF TX signal.

The transceiver device may implement a shift in (center) frequency of the signal that it provides (thus shifting the TX signal into the RX band). Further, the TX signal is not only shifted to the RX band, but it is also modified itself and this modification is a non-linear modification that also widens the spectrum of the TX signal, for example. Part of that widened spectrum may later on be chopped off again, this may correspond to the portion. There may be a difference between first widening a spectrum and then chopping it off (e.g. filtering again to the RX bandwidth) and doing it in the other order (e.g. first filtering a part of the TX signal and then widening it). For example, there may be intermodulation of two spectrum components that are themselves are going to lie outside the RX band, but the intermodulation product may lie inside the RX band.

Therefore, at least a portion of the received high frequency receive signal may be covered, for example. The compensation signal generator module comprising a non-linear distortion of the baseband transmit signal, for example.

For example, the generator may comprise a non-linear, spectrum widening TX channel spectrum modification.

A harmonic spectrum may be generated by using complex plane polar coordinates, by using complex plane Cartesian coordinates or by using Low IF (intermediate frequency), real number domain, for example.

For example, the compensation signal generator module comprises a harmonic generator module configured to generate a harmonic generator output signal based on a signal containing information on the baseband transmit signal.

Further, the generator may generate the compensation signal from a polar representation of the baseband TX signal. For example, at least one component of the compensation signal is having a phase equal to the phase of the TX signal multiplied by the number of harmonic and an amplitude equal to the amplitude of the TX Signal taken to the power of at least n.

Alternatively, the compensation signal may be generated based on a polar representation of the baseband TX signal or the generator may generate the compensation signal based on a Cartesian representation of the baseband TX signal. For example, at least one component of the compensation signal is equal to the complex TX signal taken to the power of n.

Optionally, the generator may generate the compensation signal based on a real representation of the baseband TX signal, also known as low IF. For example, at least one component of the compensation signal is the n-th harmonic spectrum, generated by using the low IF signal taken to the power of at least n.

In some examples, the third harmonic (n=3) spectrum can contain 3rd order, but also 5th order components or even higher odd order components.

In general, it may contain components of order $n+2*m$ with integer $m>=0$. The phase of the third harmonic may be the phase of the TX signal times 3 but the amplitude may contain contributions of higher order.

In the case of complex BB TX spectrum being available, the generation of 3rd harmonic, containing 3rd and 5th order components may be obtained by following formulas, for example:

X=I+jQ complex TX BB Signal

Y 3rd harmonic complex BB spectrum, (only 3rd harmonic, but also containing amplitude part of 5th order)

c3, c5 coefficients of amplitude part of 3rd and 5th order

X* Complex conjugate of X

Cartesian: $Y=X^3*(c3+c5*abs(X)^2)=X^3*(c3+c5*X*X*))$;

Polar: $Y=abs(X)^3*(c3+c5*abs(X)^2)*exp(3*j*arg(X))$

Figure 5:
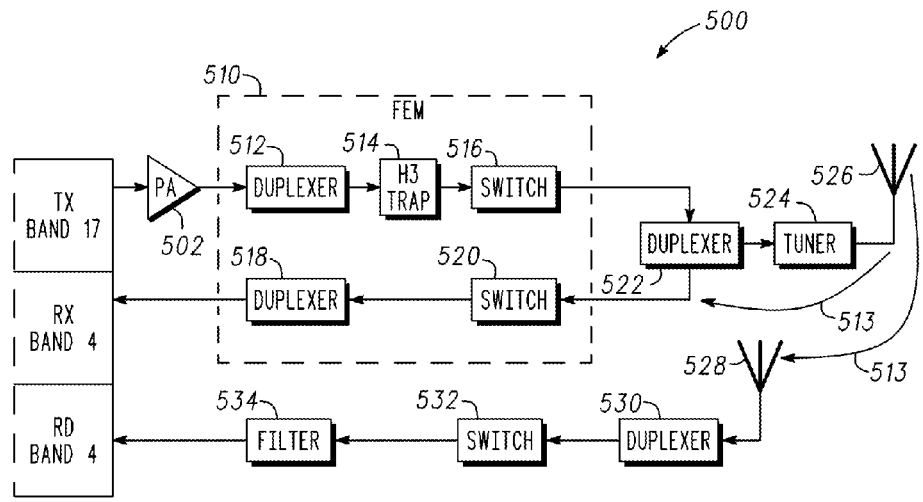
FIG. 5 shows a block diagram of an antenna module of a transceiver.

In case of lower IF x low IF real signal y nonlinear spectrum, including 3rd harmonic $y=x^3*(c3+c5*x^2)$ FIG. 5 shows a block diagram of an antenna module 500 connectable to a proposed transceiver device. The antenna module 500 comprises one transmit path (e.g. for transmitter Tx band 17) and two receive paths (for receiver Rx band 4 and receive diversity RD band 4). The transmit path comprises a power amplifier 502 (may be part of the transceiver device), a duplexer 512, a third harmonic H3 trap 514, a switch 516 and the main receive path may comprise a switch 520 and a duplexer 518. The duplexer 512, the H3 trap 514 and the switch 516 of the transmit path and the duplexer 518 and the switch 520 of the main receive path may be implemented by a front end module FEM 510, for example. The transmit path and the main receive path are connected to a duplexer 522, which is connected to an antenna 526 through a tuner 524. The diversity receive path comprises another antenna 528, a duplexer 530, a switch 532 and a filter 534. Undesired harmonic signal portions generated in the transmit path may be parasitically coupled to the receive paths 513.

The third harmonic H3 trap 514 may be removed or avoided due to the proposed compensation concept, for example.

Some examples relate to a digital cancellation (or compensation) of Tx harmonic in Rx baseband. A harmonic cancellation for carrier aggregation may be implemented. A proposed transceiver may be implemented by digital signal processing (e.g. within an LTE modem). The proposed concept may be used for high volume architectures, may be embodied in computer system architecture features and interfaces made in high volumes may encompass IA (integrated architecture) devices (e.g. transistors) and associated MFG (manufacturing) processes, for example. A proposed transceiver device may be implemented in radio frequency RF equipment operating above 31.8 GHz (e.g. implemented by metal oxide semiconductor MOS or complementary metal oxide semiconductor CMOS technology), for example.

A proposed apparatus may help to keep Rx reference sensitivity high for such use cases. For example, the Tx third harmonic may desense an aggregated Rx channel (e.g. B17 (Tx/Rx)+B4 (Rx) CA or B12 (Tx/Rx)+B4 (Rx) CA). In addition, a further possibility of desense may be (e.g. B8 (Tx/Rx)+B7 (Rx) CA or B28 (Tx/Rx)+B1 (Rx) CA) and several bands that Tx third harmonic can desense WLAN (wireless local area network) or BT (blue tooth).

A proposed apparatus may generate a replica of the third harmonic Tx-RF signal spectrum by using digital signal processing on the Tx baseband signal. This signal may then be modified by filtering under control of an estimator. The resulting signal may then be used to cancel or compensate at least a part of the third harmonic interferer of Tx on the Rx baseband side.

For example, a proposed apparatus may generate a replica of the Tx-RF third harmonic in digital baseband to cancel or compensate the Tx-RF third harmonic signal generated in the analog front end components. Additional effort for improvement of analog components may be avoided in this way, for example.

A third harmonic may be generated by using digital signal processing and may be filtered and frequency-shifted to align with the RF third harmonic overlap of the desired Rx channel. In addition, a low complexity algorithm for determining when the harmonic translation may be enabled may be implemented.

A proposed transceiver system may comprise a transmitter and receiver with a digital baseband, transmitting and receiving at the same time. The nonlinear impairments of the transmitter may generate harmonic distortion frequency components at frequency N*freqTx. The freqTx is the RF carrier frequency and N is an integer number greater or equal to 2. The harmonic distortion frequency N*freqTx may fall into the frequency range of the receive band and due to insufficient transmit-receive isolation the receiver signal may be distorted. A digital cancellation component may build a digital replica of this harmonic distortion by the help of the digital Tx baseband signal. This replica may be subtracted from the digital Rx signal before the receive signal is entering the digital baseband and therefore removing at least a part of the distortion from the digital Rx signal.

Further, a special complex baseband approach may generate the replica harmonic signal in the polar signal domain. This may include the addition of a frequency offset by applying a phase ramp according to a calculated frequency offset in combination with an estimated fixed phase offset (e.g. estimated by correlation with the received signal). An alternative approach may up-convert the Tx reference signal by at least half channel BW to the real domain prior to cubing (or squaring or whatever appropriate power). Then, down-converting with appropriate frequency offset included.

Further, the application of learning for the cancellation states that do not change significantly between Tx/Rx allocation on the same channel may be proposed. For example, the nonlinear coefficients, delay states, amplitude and fractional/adaptive filter states can all be stored and reapplied for reducing settling time (e.g. during aggregated Rx carrier warm up). It may be expected that differences in up-link UL and downlink DL scheduling on the aggregated carrier may result in enabling/disabling the cancellation algorithm with minor differences in the harmonic levels or a response but with unpredictable phase differences, for example.

Further, a control algorithm for determining when to turn on or off the cancellation algorithm based on calculation of Tx allocated receive band RBs harmonic having frequency overlap or no overlap of the desired Rx channel may be implemented. In addition, Tx Pout (transmit power amplifier output) and Rx RSSI (receiver receives signal strength indication) thresholds may also be utilized to only turn on the cancellation algorithm when harmonic desense levels would be an issue, for example. The Tx Pout may be above a threshold (Tx_Pout_harm_threshold), but this threshold may be ??? by the harmonic spectral density in the desired Rx band (e.g. what percentage of the harmonic falls in the Rx band). If only 10% (or only 20%, only 5% or only 1%), then the Tx Pout threshold may be increased by approximately 10 dB (or 20 dB or 20 dB or 5 dB). It may only be canceled when the harmonic can be strong enough to cause significant influence (e.g. which may occur only for the top few dB of Tx Pout). The Rx RSSI may be above a threshold (e.g. Rx_RSSI_harm_threshold). The harmonic interference may be only an issue for low Rx levels and at higher levels running the algorithm may cause an Rx EVM (Error Vector Magnitude) degradation, for example.

The proposed concept may be applicable for both polar and quadrature transmitter architectures and may be valuable for all mobile cellular and connectivity solutions, for example.

Figure 6:
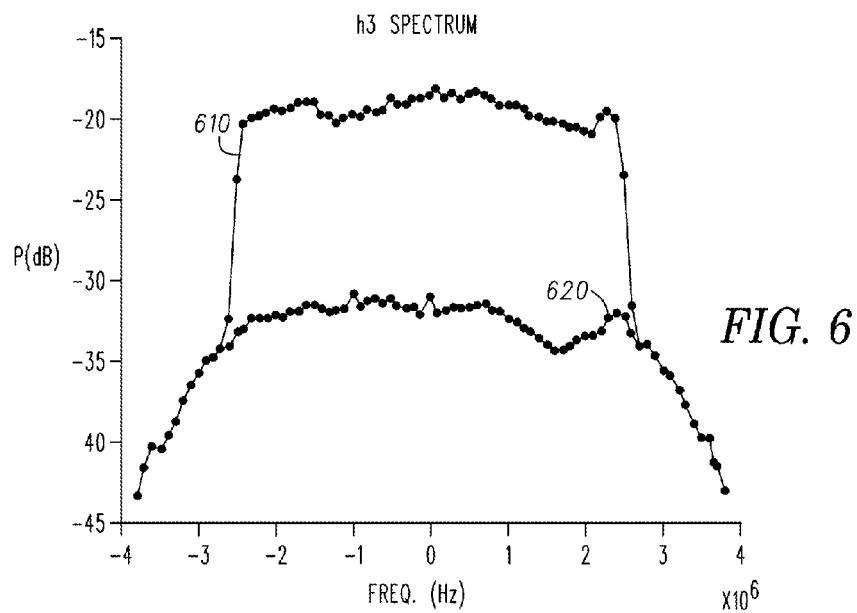
FIG. 6 shows a simulation result of third harmonic signal portions within a receive signal.

FIG. 6 shows a simulation result for a measured Rx data stream and a known Tx data stream demonstrating the performance, which may be seen with the algorithm on real measure data. A transceiver engine was used to capture an Rx IQ data stream (e.g. at the digital radio frequency DigRF interface) of band 4 Rx for the case where band 17 Tx/Rx is aggregated with band 4 Rx and the third harmonic of the B17 Tx causes significant interference in the B4 Rx channel. A known Tx stimulus was used in order to perform the offline replica harmonic signal generation for cancellation. In the Figure, the levels are shown in dB and represent dBFS. It shows a first signal 610 representing a baseband BB h3 in Rx without any cancellation and a second signal 620 representing a signal with h3 BB frequency response compensation and cancellation indicating the h3 spectrum by a power (in dB) over frequency (in Hz) diagram. In this case, approximately 12 dB desense occurred prior to cancellation (curve 610) and after applying the offline cancellation algorithm, the Rx signal spectrum of curve 620 occurs, for example.

For example, the proposed concept may be implemented within an LTE (long term evolution) modem with carrier aggregation support for bands 17 and 4.

Some examples relate to a mobile device (e.g. a cell phone, a tablet or a laptop) comprising a transceiver device described above. The mobile device or mobile terminal may be used for communicating in a mobile communication system.

Figure 7:
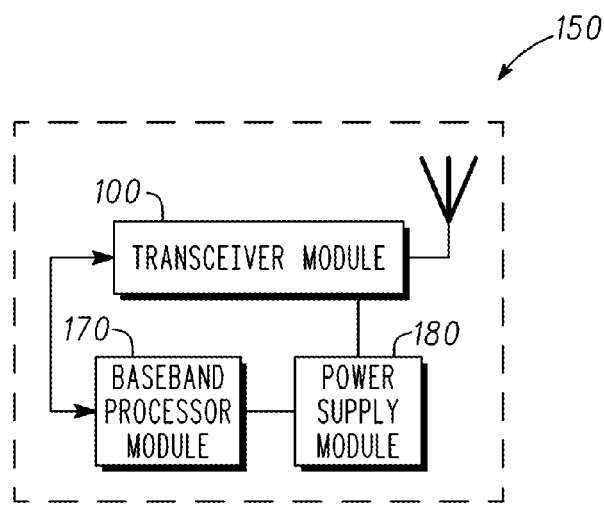
FIG. 7 shows a block diagram of a mobile device.

FIG. 7 shows a schematic illustration of a mobile device 150. The mobile device comprises a transceiver device (e.g. FIG. 1-4). Further, the mobile device 150 comprises a baseband processor module 170 generating baseband signal to be transmitted and/or processing a baseband receive signal. Additionally, the mobile device 150 comprises a power supply unit 180 supplying at least the transceiver module 100 and the baseband processor module 170 with power.

In some examples, a cell phone may comprise a transceiver according to the proposed concept or one or more examples described above.

Further, some examples relate to a base station or a relay station of a mobile communication system comprising a transceiver according to the described concept or one or more examples described above.

A mobile communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), Long Term Evolution (LTE) or LTE-Advanced (LTE-A), or mobile communication systems with different standards, e.g. Worldwide Interoperability for Microwave Access (WI-MAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

The mobile communication system may comprise a plurality of transmission points or base station transceivers operable to communicate radio signals with a mobile transceiver. In these examples, the mobile communication system may comprise mobile transceivers, relay station transceivers and base station transceivers. The relay station transceivers and base station transceivers can be composed of one or more central units and one or more remote units.

A mobile transceiver or mobile device may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some examples a cell may correspond to a sector. For example, sectors can be achieved using sector antennas, which provide a characteristic for covering an angular section around a base station transceiver or remote unit. In some examples, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

Figure 8:
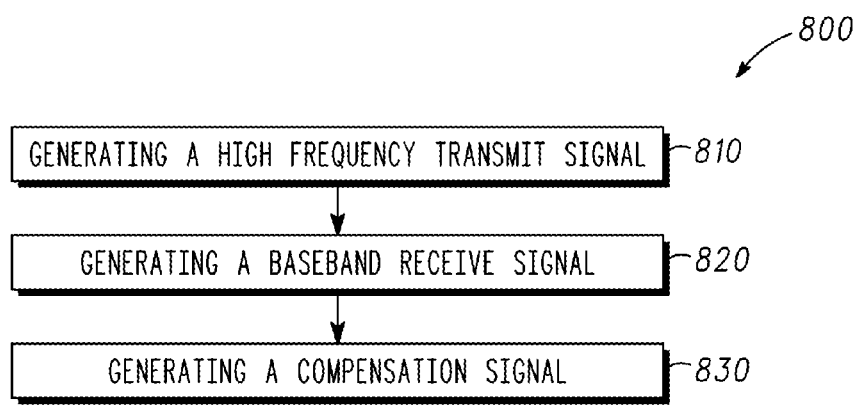
FIG. 8 shows a flowchart of a method for generating a compensation signal.

FIG. 8 shows a flowchart of a method 800 for generating a compensation signal according to an example. The method comprises generating 810 a high frequency transmit signal based on a baseband transmit signal and generating 820 a baseband receive signal based on a received high frequency receive signal. The method 800 further comprises generating 830 a compensation signal comprising at least one signal portion with a frequency equal to a frequency of an undesired signal portion of the baseband receive signal caused by an undesired signal portion within the high frequency transmit signal comprising a frequency equal to an integer multiple of a transmit frequency of the high frequency transmit signal.

For example, the high frequency transmit signal may be generated by a transmit path module, the baseband receive signal may be generated by a receive path module and the compensation signal may be generated by a compensation signal generator (e.g. FIG. 1-4).

For example, the Nth harmonic may overlap the Rx signal, a transceiver state information may be checked (like Tx power, etc.) and/or a frequency offset may be applied.

Further, the method 800 may comprise one or more optional, additional acts, corresponding to one or more aspects mentioned in connection with the described concept or one or more examples described above (e.g. calculating if the Nth harmonic overlaps the Rx signal, checking transceiver state information (like Tx power, etc.), applying a frequency offset, e.g. mentioned in connection with FIGS. 1 to 4).

In the following examples pertain to further examples. Example 1 is transceiver device comprising a transmit path module configured to generate a high frequency transmit signal based on a baseband transmit signal comprising a frequency component, a receive path module configured to generate a baseband receive signal based on a received high frequency receive signal and a compensation signal generator module configured to generate a compensation signal by nonlinear signal processing of the baseband transmit signal, the compensation signal comprises at least a signal portion of a harmonic of the frequency component that interferes with a channel bandwidth of the receive path module.

In example 2, the subject matter of example 1 can optionally include the compensation signal generator module comprising a harmonic generator module configured to generate a harmonic generator output signal based on a signal containing information on the baseband transmit signal.

In example 3, the subject matter of example 2 can optionally include the harmonic generator module configured to generate a harmonic generator output signal based on a polar modulated baseband signal containing information on the baseband transmit signal.

In example 4, the subject matter of example 3 can optionally include the harmonic generator module comprising a multiplier module configured to generate a multiplier output signal based on a multiplication of the phase signal of the polar modulated baseband signal with the integer multiple.

In example 5, the subject matter of example 3 or 4 can optionally include the harmonic generator module comprising an adder module configured to generate an adder output signal based on an addition of the phase signal of the polar modulated baseband signal or the multiplier output signal and an offset signal.

In example 6, the subject matter of any one of examples 3-5 can optionally include the harmonic generator module comprising an amplitude adaptation module configured to generate an amplitude adaptation output signal based on the amplitude signal of the polar modulated baseband signal and at least one amplitude adaptation parameter signal.

In example 7, the subject matter of example 6 can optionally include the harmonic generator module comprising a coordinate conversion module configured to generate an inphase-quadraturephase modulated baseband transmit signal based on the amplitude adaptation output signal and the multiplier output signal or the adder output signal.

In example 8, the subject matter of any one of examples 1-7 can optionally include the compensation signal generator module comprising a harmonic generator module configured to generate a harmonic generator output signal based on an inphase-quadraturephase modulated baseband signal containing information on the baseband transmit signal.

In example 9, the subject matter of example 8 can optionally include the harmonic generator module configured to generate the harmonic generator output signal based on at least determining the inphase-quadraturephase modulated baseband signal to the power of the integer multiple.

Optionally, the compensation signal generator module is configured to generate the compensation signal based on a frequency shift applied to a baseband signal containing information on the baseband transmit signal.

Further optionally, the compensation signal generator module is configured to generate the compensation signal with a phase corresponding to a phase of the baseband transmit signal multiplied by an integer greater than 1.

In example 10, the subject matter of any one of examples 3-9 can optionally include the compensation signal generator module comprising a low pass filter module configured to generate a low pass filter module output signal by low pass filtering a baseband signal containing information on the harmonic generator output signal.

In example 11, the subject matter of example 10 can optionally include the low pass filter module comprising a cut-off frequency higher than a cut-off frequency of a channel filter of the receive path.

In example 12, the subject matter of example 10 or 11 can optionally include the low pass filter module comprises a frequency response corresponding to a frequency response of a low pass filter module of the receive path.

In example 13, the subject matter of any one of examples 3-12 can optionally include the compensation signal generator module comprising an integer delay module configured to generate an integer delay module output signal by delaying a baseband signal containing information on the harmonic generator output signal.

In example 14, the subject matter of any one of examples 3-13 can optionally include the compensation signal generator module comprising a down-sampling module configured to generate a down-sampling module output signal by down-sampling a baseband signal containing information on the harmonic generator output signal.

In example 15, the subject matter of example 14 can optionally include the down-sampling module comprising a sampling ration equal to a sampling ration of a down-sampling module of the receive path.

In example 16, the subject matter of any one of examples 3-15 can optionally include the compensation signal generator module comprising an adaptive filter module configured to generate an adaptive filter module output signal by adaptively filtering a baseband signal containing information on the harmonic generator output signal.

In example 17, the subject matter of example 16 can optionally include the adaptive filter module configured to delay the baseband signal containing information on the harmonic generator output signal by a delay below a minimal delay generatable by the integer delay module.

In example 18, the subject matter of example 16 or 17 can optionally include the adaptive filter module configured to filter the baseband signal containing information on the harmonic generator output signal corresponding to a multipath harmonic source or a multipath propagation delay.

In example 19, the subject matter of any one of examples 3-18 can optionally include the compensation signal generator module comprising an amplitude scaling module configured to generate an amplitude scaling module output signal by multiplying a baseband signal containing information on the harmonic generator output signal with an amplitude scaling signal.

In example 20, the subject matter of any one of examples 3-19 can optionally include the compensation signal generator module comprising an estimator module configured to provide at least one estimator module output signal containing information on at least one parameter for phase adaptation, frequency adaptation or amplitude adaptation to the harmonic generator module.

In example 21, the subject matter of example 20 can optionally include the estimator module configured to generate the at least one estimator module output signal based on a baseband signal containing information on the baseband receive signal, a baseband signal containing information on the harmonic generator output signal and a transceiver state information.

In example 22, the subject matter of example 20 or 21 can optionally include a band width of the baseband signal containing information on the baseband receive signal provided to the estimator module being substantially equal to a bandwidth of the compensation signal.

In example 23, the subject matter of any one of examples 20-22 can optionally include the estimator module configured to generate the at least one estimator module output signal based on differently delayed versions of the baseband signal containing information on the harmonic generator output signal.

In example 24, the subject matter of any one of examples 20-23 can optionally include the estimator module configured to generate the at least one estimator module output signal based on an error signal derived from a compensated baseband receive signal after consideration of the compensation signal.

In example 25, the subject matter of any one of examples 20-24 can optionally include the estimator module configured to generate the at least one estimator module output signal based on at least on adaptive filter state provided by the adaptive filter module of the compensation signal generator module.

In example 26, the subject matter of any one of examples 20-25 can optionally include the estimator module configured to provide at least one filter coefficient to the adaptive filter module of the compensation signal generator module.

In example 27, the subject matter of any one of examples 20-26 can optionally include the estimator module configured to provide the amplitude scaling signal to the amplitude scaling module of the compensation signal generator module.

In example 28, the subject matter of any one of examples 20-27 can optionally include the estimator module configured to provide a delay control signal to the integer delay module of the compensation signal generator module for controlling a delay generated by the integer delay module.

In example 29, the subject matter of any one of examples 20-28 can optionally include the estimator module configured to determine a signal, a parameter or a coefficient based on a correlation, a complex correlation, a least square algorithm, an adaptive filtering, a complex adaptive filtering, an adaptive coefficient updating or learning depending on transceiver states.

In example 30, the subject matter of any one of examples 1-29 can optionally include a compensation module configured to generate a compensated baseband receive signal based on the compensation signal and a baseband signal containing information on the baseband receive signal.

Optionally, the compensation signal generator module is configured to generates a nonlinear distortion of the baseband transmit signal during the generation of the compensation signal.

In example 31, the subject matter of example 28 can optionally include the compensation module configured to subtract the compensation signal from the baseband signal containing information on the baseband receive signal.

In example 32, the subject matter of example 29 can optionally include the compensation module being arranged before a narrowest low pass filter of the receive path with regard to a signal processing direction.

In example 33, the subject matter of any one of examples 1-32 can optionally include the compensation signal being a digital signal.

In example 34, the subject matter of any one of examples 1-33 can optionally include the compensation signal generator module being a digital signal processing module.

In example 35, the subject matter of any one of examples 1-34 can optionally be configured to transmit the high frequency transmit signal and receive the high frequency receive signal at the same time.

In example 36, the subject matter of any one of examples 3-35 can optionally include a memory unit configured to store at least one parameter used for phase adaption, frequency adaption or amplitude adaption by the harmonic generator module.

In example 37, the subject matter of example 36 can optionally include the memory unit configured to provide the at least one parameter to the harmonic generator module for reuse.

In example 38, the subject matter of any one of examples 1-37 can optionally include an up-sampling module configured to generate an up-sampled baseband transmit signal by sampling a baseband signal containing information on the baseband transmit signal with a frequency of at least the integer multiple times the transmit frequency of the high frequency transmit signal.

In example 39, the subject matter of any one of examples 1-38 can optionally include a compensation control module configured to deactivate a consideration of the compensation signal, if signal portions of the high frequency receive signal caused by undesired signal portions within the high frequency transmit signal comprising frequencies equal to an integer multiple of a transmit frequency of the high frequency transmit signal are located only at frequencies outside a current receive band of the receive path.

In example 40, the subject matter of any one of examples 1-39 can optionally include a compensation control module configured to activate a consideration of the compensation signal, if a desense of the baseband receive signal due to signal portions of the baseband receive signal caused by undesired signal portions within the high frequency transmit signal comprising frequencies equal to an integer multiple larger than 1 of a transmit frequency of the high frequency transmit signal exceeds a predefined desense threshold.

Example 41 is a transceiver device comprising means for transmitting a signal configured to generate a high frequency transmit signal based on a baseband transmit signal, means for receiving a signal configured to generate a baseband receive signal based on a received high frequency receive signal and means for generating a compensation signal configured to generate a compensation signal comprising at least one signal portion with a frequency equal to a frequency of an undesired signal portion of the baseband receive signal caused by an undesired signal portion within the high frequency transmit signal comprising a frequency equal to an integer multiple larger than 1 of a transmit frequency of the high frequency transmit signal.

In example 42, the subject matter of example 41 can optionally include the means for generating a compensation signal configured to generate the compensation signal based on the baseband transmit signal.

Example 43 is a mobile device comprising a transceiver according device to any of the previous examples.

Example 44 is a cell phone comprising a transmitter, a receiver or a transceiver according to any of the previous examples.

Example 45 is a method for generating a compensation signal, the method comprising generating a high frequency transmit signal based on a baseband transmit signal, generating a baseband receive signal based on a received high frequency receive signal and generating a compensation signal comprising at least one signal portion with a frequency equal to a frequency of an undesired signal portion of the baseband receive signal caused by an undesired signal portion within the high frequency transmit signal comprising a frequency equal to an integer multiple larger than 1 of a transmit frequency of the high frequency transmit signal.

In example 46, the subject matter of example 45 can optionally include the compensation signal generated based on the baseband transmit signal.

Example 47 is a machine readable storage medium including program code, when executed, to cause a machine to perform the method of example 45.

Example 48 is a machine readable storage including machine readable instructions, when executed, to implement a method or realize an apparatus as implemented by any one of examples 1-46.

Example 49 is a computer program having a program code for performing the method of example 45, when the computer program is executed on a computer or processor.

Examples may further provide a computer program having a program code for performing one of the above methods, when the computer program is executed on a computer or processor. A person of skill in the art would readily recognize that steps of various above-described methods may be performed by programmed computers. Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. The examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

The invention claimed is:

1. A transceiver device comprising:
   transmit path circuitry configured to generate a high frequency transmit signal based on a baseband transmit signal comprising a frequency component;
   receive path circuitry configured to generate a baseband receive signal based on a received high frequency receive signal; and
   compensation signal generator circuitry configured to generate a compensation signal by signal processing of the baseband transmit signal, wherein the compensation signal generator circuitry comprises harmonic generator circuitry to generate a harmonic generator output signal based on the baseband transmit signal and on at least one specified harmonic of the frequency component wherein the compensation signal comprises at least a signal portion specific to the at least one specified harmonic that interferes with a channel bandwidth of the receive path circuitry;
   wherein the receive path circuitry includes compensation circuitry that is configured to subtract the compensation signal from the baseband receive signal.

2. The transceiver device according to claim 1, wherein the harmonic generator circuitry is configured to generate a harmonic generator output signal based on a polar modulated baseband signal containing information on the baseband transmit signal.

3. The transceiver device according to claim 2, wherein the harmonic generator circuitry comprises multiplier circuitry configured to generate a multiplier output signal based on a multiplication of the phase signal of the polar modulated baseband signal with an integer multiple.

4. The transceiver device according to claim 1, wherein the harmonic generator circuitry comprises adder circuitry configured to generate an adder output signal based on an addition of the phase signal of the polar modulated baseband signal or the multiplier output signal and a frequency offset signal comprising information on an frequency offset.

5. The transceiver device according to claim 1, wherein the harmonic generator circuitry comprises amplitude adaptation circuitry configured to generate an amplitude adaptation output signal based on the amplitude signal of the polar modulated baseband signal and at least one amplitude adaptation parameter signal comprising information on a non-linear distortion.

6. The transceiver device according to claim 5, wherein the harmonic generator circuitry comprises coordinate conversion circuitry configured to generate an inphase-quadraturephase modulated baseband transmit signal based on the amplitude adaptation output signal and the multiplier output signal or the adder output signal.

7. The transceiver device according to claim 1, wherein the compensation signal generator circuitry comprises harmonic generator circuitry configured to generate a harmonic generator output signal based on an inphase-quadraturephase modulated baseband signal containing information on the baseband transmit signal.

8. The transceiver device according to claim 7, wherein the harmonic generator circuitry is configured to generate the harmonic generator output signal based on at least determining the inphase-quadraturephase modulated baseband transmit signal to the power of an integer multiple, a frequency up-conversion to at least half a channel bandwidth and a frequency shift.

9. The transceiver device according to claim 1, wherein the compensation signal generator circuitry is configured to generate the compensation signal based on a frequency shift applied to a baseband signal containing information on the baseband transmit signal.

10. The transceiver device according to claim 1, wherein the compensation signal generator circuitry is configured to generate the compensation signal with a phase corresponding to a phase of the baseband transmit signal multiplied by an integer greater than 1.

11. The transceiver device according to claim 2, wherein the compensation signal generator circuitry comprises low pass filter circuitry configured to generate a low pass filter output signal by low pass filtering a baseband signal containing information on the harmonic generator output signal.

12. The transceiver device according to claim 11, wherein the low pass filter circuitry comprises a cut-off frequency higher than a cut-off frequency of a channel filter of the receive path.

13. The transceiver device according to claim 11, wherein the low pass filter circuitry comprises a frequency response corresponding to a frequency response of a low pass filter of the receive path.

14. The transceiver device according to claim 2, wherein the compensation signal generator circuitry comprises integer delay circuitry configured to generate an integer delay output signal by delaying a baseband signal containing information on the harmonic generator output signal.

15. The transceiver device according to claim 2, wherein the compensation signal generator circuitry comprises down-sampling circuitry configured to generate a down-sampling output signal by down-sampling a baseband signal containing information on the harmonic generator output signal.

16. The transceiver device according to claim 2, wherein the compensation signal generator circuitry comprises adaptive filter circuitry configured to generate an adaptive filter output signal by adaptively filtering a baseband signal containing information on the harmonic generator output signal.

17. The transceiver device according to claim 2, wherein the compensation signal generator circuitry comprises an estimator module configured to provide at least one estimator output signal containing information on at least one parameter for phase adaptation, frequency adaptation or amplitude adaptation to the harmonic generator circuitry.

18. The transceiver device according to claim 1, comprising compensation circuitry configured to generate a compensated baseband receive signal based on the compensation signal and a baseband signal containing information on the baseband receive signal.

19. The transceiver device according to claim 1, wherein the compensation signal generator circuitry is a digital signal processor.

20. The transceiver device according to claim 1, comprising compensation control circuitry configured to deactivate a consideration of the compensation signal, if signal portions of the high frequency receive signal caused by undesired signal portions within the high frequency transmit signal comprising frequencies equal to an integer multiple of a transmit frequency of the high frequency transmit signal are located only at frequencies outside a current receive band of the receive path.

21. A mobile device comprising the transceiver device according to claim 1.

22. The transceiver device according to claim 1, wherein the signal processing of the baseband transmit signal includes nonlinear signal processing.

23. A method for compensating a receive signal performed by a transceiver, the method comprising:
generating a high frequency transmit signal based on a baseband transmit signal comprising a frequency component;
generating a baseband receive signal based on a received high frequency receive signal; and
generating a compensation signal by signal processing of the baseband transmit signal, including generating a harmonic signal that is based on the baseband transmit signal and on at least one specified harmonic of the frequency component wherein the compensation signal comprises at least a signal portion specific to the at least one specified harmonic that interferes with the baseband receive signal; and
subtracting the compensation signal from the baseband receive signal.

24. At least one non-transitory computer-readable storage medium that stores instructions for execution by one or more processors of a transceiver device to configure the device to perform operations to:
generate a high frequency transmit signal based on a baseband transmit signal comprising a frequency component;

generate a baseband receive signal based on a received high frequency receive signal; and generate a compensation signal by signal processing of the baseband transmit signal, including generating a harmonic signal that is based on the baseband transmit signal and on at least one specified harmonic of the frequency component wherein the compensation signal comprises at least a signal portion specific to the at least one specified harmonic that interferes with the baseband receive signal; and subtract the compensation signal from the baseband receive signal.

* * * * *

UNITED STATES PATENT AND TRADEMARK OFFICE
CERTIFICATE OF CORRECTION

PATENT NO. : 9,680,671 B2
APPLICATION NO. : 14/550277
DATED : June 13, 2017
INVENTOR(S) : Noest et al.

It is certified that error appears in the above-identified patent and that said Letters Patent is hereby corrected as shown below:

On the Title Page

Item (30), in "Foreign Application Priority Data", in Column 1, Line 1, delete "10 2013 114 797" and insert --102013114797.6-- therefor Signed and Sealed this
Thirtieth Day of July, 2019

Andrei Iancu
*Director of the United States Patent and Trademark Office*